(12) United States Patent
So et al.

(10) Patent No.: US 12,297,959 B2
(45) Date of Patent: May 13, 2025

(54) GAS CYLINDER AUTOMATION SYSTEM

(71) Applicant: Samsung Electronics Co., Ltd., Suwon-si (KR)

(72) Inventors: Jinho So, Seoul (KR); Kwangiun Kim, Ansan-si (KR); Chigun An, Suwon-si (KR); Huigwan Lee, Hwaseong-si (KR); Hyungho Choi, Suwon-si (KR); Junhyong Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 333 days.

(21) Appl. No.: 17/876,064

(22) Filed: Jul. 28, 2022

(65) Prior Publication Data

US 2023/0129083 A1    Apr. 27, 2023

(30) Foreign Application Priority Data

Oct. 22, 2021   (KR) .................. 10-2021-0141644

(51) Int. Cl.
*F17C 13/02*   (2006.01)
*F17C 13/08*   (2006.01)
(Continued)

(52) U.S. Cl.
CPC ............ *F17C 13/02* (2013.01); *F17C 13/084* (2013.01); *G01C 9/00* (2013.01); *G01L 5/00* (2013.01); *G01P 15/00* (2013.01); *F17C 2201/0104* (2013.01); *F17C 2205/0107* (2013.01); *F17C 2205/013* (2013.01); *F17C 2250/034* (2013.01); *F17C 2250/0465* (2013.01); *F17C 2250/0478* (2013.01); *F17C 2250/0482* (2013.01);
(Continued)

(58) Field of Classification Search
CPC ................. F17C 2250/0478; F17C 2250/0491
See application file for complete search history.

(56) References Cited

U.S. PATENT DOCUMENTS

2003/0223057 A1    12/2003   Ramsey et al.
2011/0259426 A1*   10/2011   Cramer .................. F16K 17/36
                                                                137/1
(Continued)

FOREIGN PATENT DOCUMENTS

JP    H07160971 A    6/1995
JP    2021-085455 A  6/2021
(Continued)

*Primary Examiner* — Paul J Gray
(74) *Attorney, Agent, or Firm* — Harness, Dickey & Pierce, P.L.C.

(57) ABSTRACT

A gas cylinder automation system may include: a transfer path automatically supply gas in a gas cylinder brought into the gas cylinder automation system to a semiconductor process line; and a cylinder-type sensor checking whether the transfer path is abnormal by moving along the transfer path, wherein the cylinder-type sensor includes: a cylinder head including an end cap fastening member and an end cap coupled to the end cap fastening member and having a first detecting sensor disposed on the end cap fastening member to detect one of a force or torque applied to the end cap and a cylinder body connected to the cylinder head and having a second detecting sensor including at least one of an acceleration sensor or an inclination sensor mounted thereon.

10 Claims, 7 Drawing Sheets

(51) Int. Cl.
  *G01C 9/00* (2006.01)
  *G01L 5/00* (2006.01)
  *G01P 15/00* (2006.01)

(52) U.S. Cl.
  CPC ............... *F17C 2250/0491* (2013.01); *F17C 2270/0518* (2013.01)

(56) References Cited

U.S. PATENT DOCUMENTS

| | | | |
|---|---|---|---|
| 2017/0002983 A1* | 1/2017 | Carron | F17C 13/025 |
| 2019/0302082 A1 | 10/2019 | Cunningham | |
| 2021/0268897 A1* | 9/2021 | Mair | B60K 15/07 |
| 2023/0009496 A1 | 1/2023 | Kim et al. | |

FOREIGN PATENT DOCUMENTS

| | | |
|---|---|---|
| JP | 2021-085456 A | 6/2021 |
| JP | 2021-085457 A | 6/2021 |
| JP | 2021-085459 A | 6/2021 |
| KR | 10-2009-0124289 A | 12/2009 |
| KR | 101980048 B1 | 5/2019 |
| KR | 10-2020-0107795 A | 9/2020 |
| KR | 10-2021-0014059 A | 2/2021 |
| KR | 10-2023-0009013 A | 1/2023 |

\* cited by examiner

GAS CYLINDER AUTOMATION SYSTEM

CROSS-REFERENCE TO RELATED APPLICATION

This application claims benefit of priority to Korean Patent Application No. 10-2021-0141644 filed on Oct. 22, 2021 in the Korean Intellectual Property Office, the disclosure of which is incorporated herein by reference in its entirety.

BACKGROUND

1. Field

The present disclosure relates to a gas cylinder automation system including the same.

2. Description of Related Art

Processes of manufacturing semiconductors and displays use various gases such as a cleaning gas and an etching gas. The supply of gas required for the process starts with transporting gas cylinders unloaded from a vehicle.

A gas cylinder automation system is a system automating all processes from warehousing of gas cylinders to shipment thereof. A gas cylinder may be supplied automatically to each process element.

If there is a problem in the gas cylinder automation system, excessive force may be applied to an end cap when the end cap is fastened to a gas cylinder or excessive vibrations or an impact may be applied to the gas cylinder during transportation of the gas cylinder. In general, in order to determine whether the gas cylinder automation system is abnormal, an operator is directly put into the gas cylinder automation system and checked with a hand tool. For operator safety, the entire gas cylinder automation system should be shut down.

SUMMARY

An aspect of the present disclosure may provide a gas cylinder automation system including a cylinder-type sensor capable of measuring force, torque, and acceleration applied to a gas cylinder.

According to an aspect of the present disclosure, a gas cylinder automation system may include: a transfer path automatically supply gas in a gas cylinder brought into the gas cylinder automation system to a semiconductor process line; and a cylinder-type sensor checking whether the transfer path is abnormal by moving along the transfer path, wherein the cylinder-type sensor includes: a cylinder head including an end cap fastening member and an end cap coupled to the end cap fastening member and the cylinder head having a first detecting sensor on the end cap fastening member, the first detecting sensor being configured to detect one of a force or torque applied to the end cap; and a cylinder body connected to the cylinder head and having a second detecting sensor on the cylinder body, the second detecting sensor including one of an acceleration sensor or an inclination sensor.

According to another aspect of the present disclosure, a gas cylinder automation system may include: a plurality of gas cylinders transferred by a transfer robot included in a gas cylinder transfer unit and automatically supplied to a process through at least one of a gas cylinder inspecting unit, a gas cylinder storage unit, and a gas cylinder replacing unit; and a cylinder-type sensor including a first detecting sensor that detects at least one of a force or torque applied to an end cap, the cylinder-type sensor being on a same path as a path on which the plurality of gas cylinders are moved by the transfer robot, and the first detecting sensor being configured to detect whether a module on the path is abnormal based on a detection of at least one of an abnormal force or torque by the first detecting sensor.

According to another aspect of the present disclosure, a gas cylinder automation system may include: a transfer module separating a gas cylinder and a cylinder-type sensor in a cradle brought into the gas cylinder automation system; a storage queue module storing the gas cylinder; a gas cabinet module suppling gas in the gas cylinder to a semiconductor process line; and a mobile robot module moving the gas cylinder and the cylinder-type sensor from the transfer unit to the storage queue, and from the storage queue to the gas cabinet, wherein the cylinder-type sensor checking whether each of the modules is abnormal by checking force, torque, vibration and a change in inclination applied to the cylinder-type sensor.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Some example embodiments of the present disclosure will now be described in detail with reference to the accompanying drawings.

Figure 1:
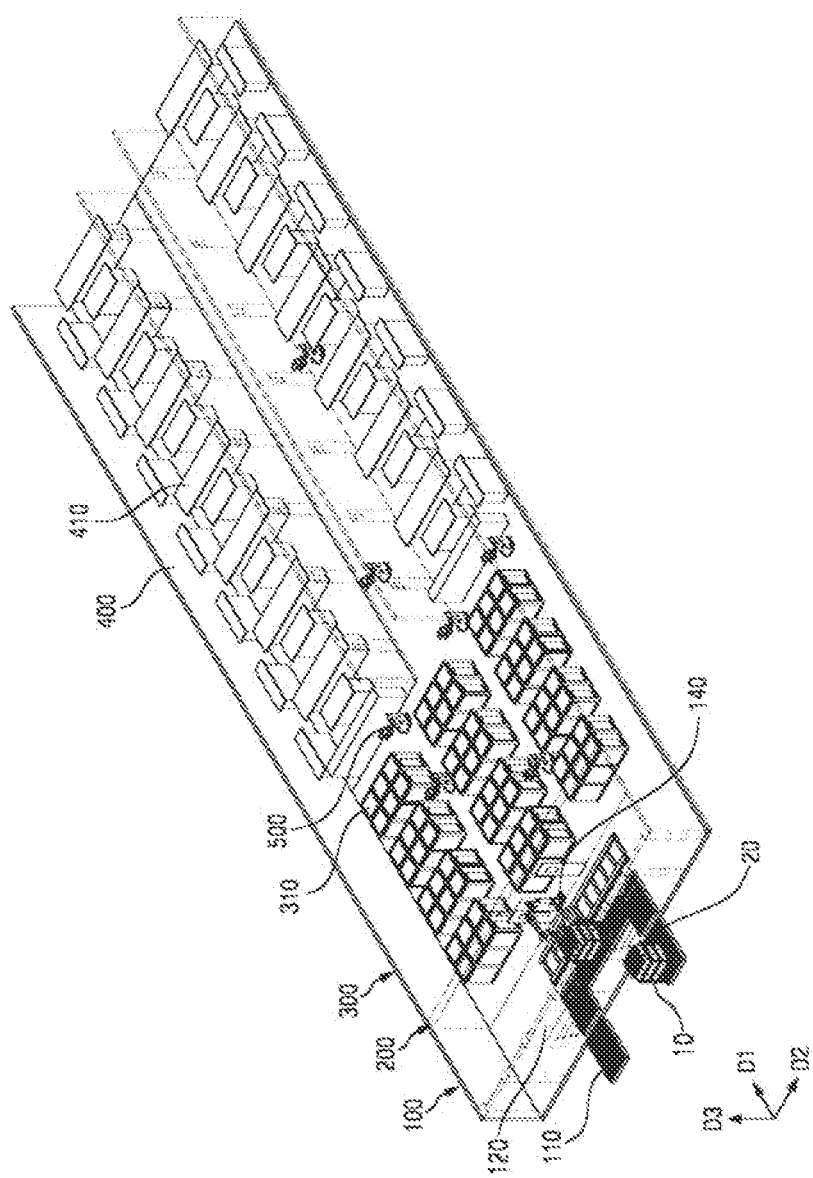
FIGS. 1 and 2 are diagrams illustrating a gas cylinder automation system according to some example embodiments of the present disclosure.
Figure 2:
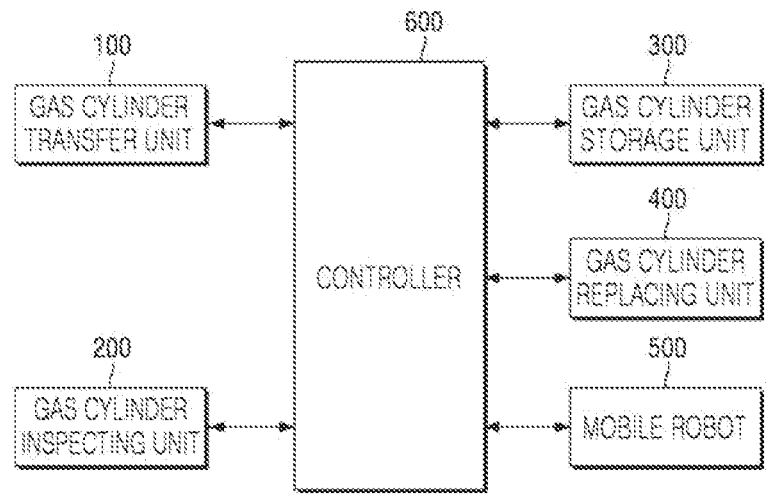

FIGS. 1 and 2 are diagrams illustrating a gas cylinder automation system according to some example embodiments of the present disclosure.

Referring to FIGS. 1 and 2 together, a gas cylinder automation system may include a gas cylinder transfer unit 100, a gas cylinder inspecting unit 200, a gas cylinder storage unit 300, a gas cylinder replacing unit 400, at least one mobile robot 500, and a controller 600.

The controller 600 may control the gas cylinder automation system. The controller 600 may control the gas cylinder transfer unit 100, the gas cylinder inspecting unit 200, the gas cylinder storage unit 300, the gas cylinder replacing unit 400, and at least one mobile robot 500.

The gas cylinders 20 unloaded from a vehicle may be stored in a cradle 10 and provided to the gas cylinder automation system.

The gas cylinder transfer unit 100 may include a transfer unit 110 and a transfer robot 140. The gas cylinder transfer unit 100 may transfer the gas cylinder 20 to an inside through a door 120 of the gas cylinder automation system. The gas cylinder transfer unit 100 and the door 120 may be operated according to a command from the controller 600.

The cradle 10 may be loaded on the transfer unit 110. When the cradle 10 is loaded on the transfer unit 110, an operator may transmit gas cylinder warehousing information to the controller 600. The controller 600 may control the gas cylinder transfer unit 100 and the door 120. The cradle 10 may be brought into the gas cylinder automation system.

The transfer robot 140 may separate at least one gas cylinder 20 stored in the cradle 10 in units of gas cylinders 20. That is, the transfer robot 140 may grip the gas cylinder 20 and move the gas cylinder 20 to the gas cylinder inspecting unit 200. The gas cylinder inspecting unit 200 may inspect the properties of a gas in the gas cylinder 20 and whether the gas leaks.

Figure 3:
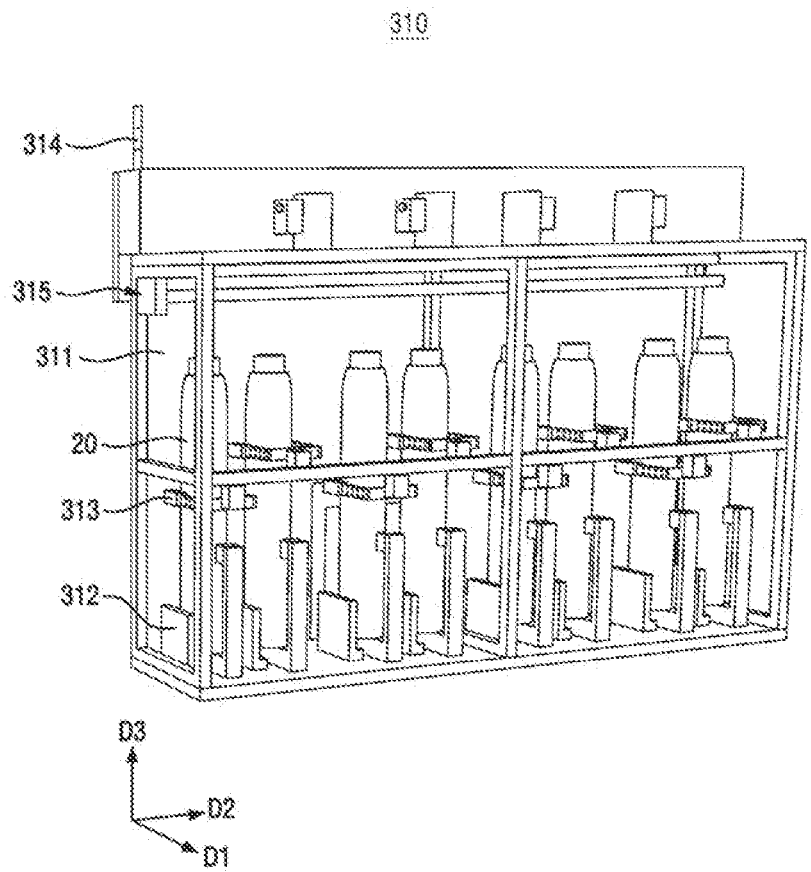
FIG. 3 is a view illustrating the gas cylinder storage unit of FIGS. 1 and 2.

FIG. 3 is a view illustrating a gas cylinder storage unit of FIGS. 1 and 2.

Referring to FIG. 3, the gas cylinder storage unit 300 may include at least one storage queue 310. The storage queue 310 may include an entry/exit member 311, a first seating part 312, a second gripper 313, a second gas detector 314, and a recognition part 315. The storage queue 310 may receive the gas cylinder 20 from the gas cylinder inspecting unit 200 by the mobile robot 500 to be described later.

The entry/exit member 311 may move in a second direction D2, and the storage queue 310 may be opened and closed. The entry/exit member 311 may be opened when the mobile robot 500 loaded with the gas cylinder 20 moves to the storage queue 310. The entry/exit member 311 may be a sliding door.

The first seating part 312 may be disposed on a lower surface of the storage queue 310. The gas cylinder 20 may be seated on the first seating part 312 by the mobile robot 500. The second gripper 313 may be disposed on a sidewall of the storage queue 310. The second gripper 313 may surround a side surface of the gas cylinder 20 stored in the first seating part 312. The gas cylinder 20 may be fixed to the storage queue 310 by the second gripper 313.

A holding detecting sensor (not shown) may be disposed on the second gripper 313. The holding detecting sensor may detect whether the second gripper 313 is holding the gas cylinder 20. The controller 600 may receive from the holding detecting sensor whether the second gripper 313 is holding the gas cylinder 20.

The controller 600 may determine a position of the second gripper 313 to hold the gas cylinder 20, that is, a position of the first seating part 312 in which the gas cylinder 20 is seated, according to whether the second gripper 313 is holding the gas cylinder 20. The mobile robot 500 may provide the gas cylinder 20 to a position determined by the controller 600.

When the storage queue 310 is closed, the second gas detector 314 may detect whether gas leaks from the gas cylinder 20. The controller 600 may receive from the second gas detector 314 whether gas leaks from the gas cylinder 20 in the storage queue 310.

The recognition part 315 may be disposed on a sidewall of the storage queue 310. The recognition part 315 may include a barcode reader that moves in the second direction D2 by an actuator. The recognition part 315 may further include a plurality of position sensors disposed on both sides of the gas cylinder 20 in the second direction D2 when the gas cylinder 20 is seated on the first seating part 312. In addition, a set interval may be greater than a width of the gas cylinder 20 in the second direction D2.

The barcode reader may recognize a barcode attached to the gas cylinder 20, while moving in the second direction D2 by the actuator in a section between adjacent position sensors. That is, the barcode reader may start a barcode recognition operation from a position sensor disposed in front of the first seating part 312 in which the gas cylinder 20 is seated, and terminate the barcode recognition operation at a position sensor disposed behind the first seating part 312 in which the gas cylinder 20 is seated. The controller 600 may receive recognized barcode data from the barcode reader.

Figure 4:
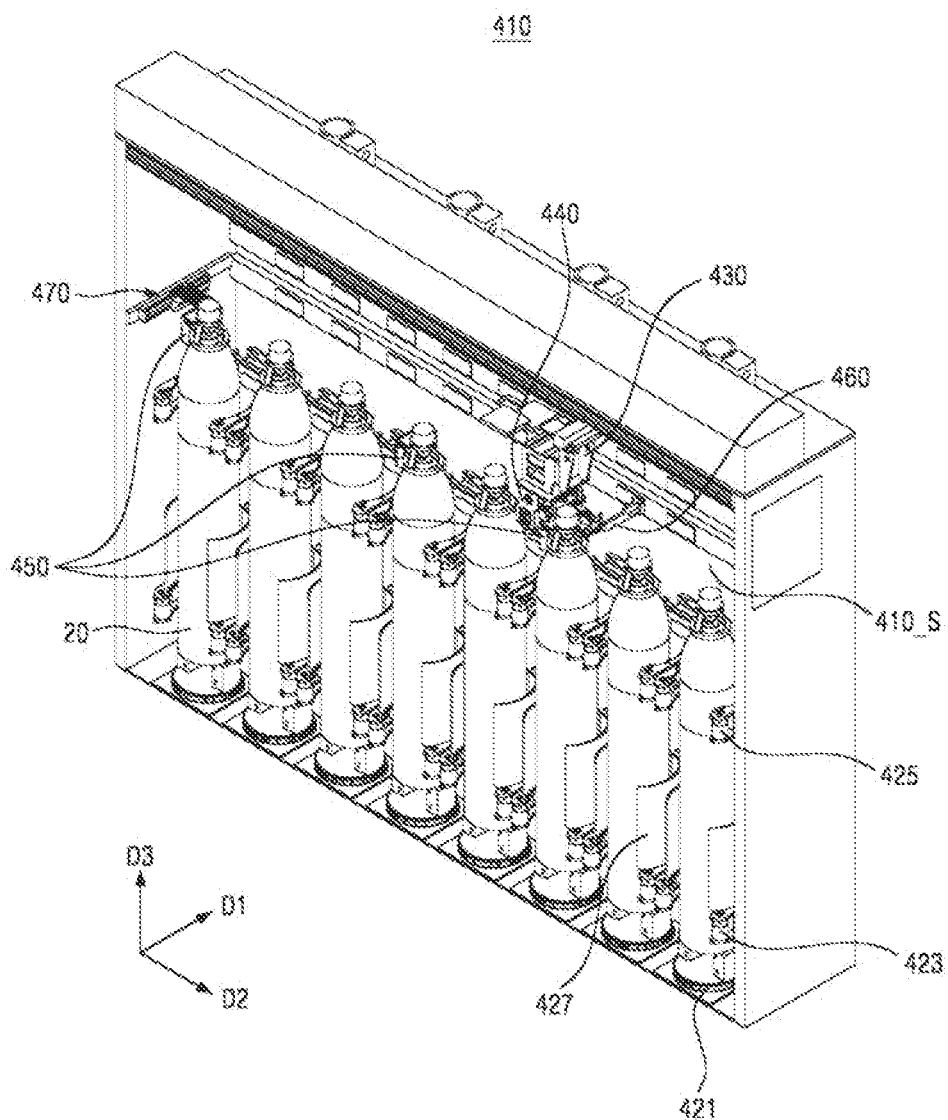
FIG. 4 is a view illustrating a gas cylinder replacing unit of FIGS. 1 and 2.

FIG. 4 is a view illustrating the gas cylinder replacing unit of FIGS. 1 and 2.

Referring to FIGS. 1, 2, and 4, the gas cylinder replacing unit 400 may include at least one gas cabinet 410 having an interior space 410_S. The gas in the gas cylinder 20 may be connected to a gas pipe connected to the semiconductor process line through the gas cabinet 410 to be supplied to a semiconductor process line.

The gas cabinet 410 includes a gas residual amount detecting part (not shown), a lower clamp module 423, an upper clamp module 425, a heating jacket 427, a second seating part 421, a traveling member 430, a common fastening device 440, a fastening member 450, a CGA plug part 460, and a gasket supplying device 470.

The gas residual amount detecting part may detect the amount of gas stored in the gas cylinder 20 connected to the gas pipe connected to the semiconductor process line in the gas cabinet 410. The controller 600 may receive the residual amount of gas stored in the gas cylinder 20 detected by the gas residual amount detecting part. The controller 600 may determine whether the residual amount of gas is equal to or less than a set residual amount of gas, and may control the mobile robot 500 and the gas cabinet 410 to replace the gas cylinder 20. The mobile robot 500 may retrieve the gas cylinder 20 from the gas cabinet 410 under the control of the controller 600, and may provide the gas cylinder 20 from the gas cylinder storage unit 300 to the gas cabinet 410 according to the properties of the gas stored in the retrieved gas cylinder 20.

At this time, the controller 600 may control the most efficient mobile robot 500 to retrieve the gas cylinder 20 from the gas cabinet 410 in consideration of a battery of the mobile robot 500 or a location of the mobile robot 500. In addition, the controller 600 may control the most efficient mobile robot 500 to deliver the gas cylinder 20 from the gas cylinder storage unit 300 to the gas cabinet 410.

The traveling member 430 may include a first actuator (not shown) therein. The traveling member 430 may receive power from the first actuator and move along a guide rail in first to third directions D1, D2, and D3.

The common fastening device 440 may be coupled to the traveling member 430. The common fastening device 440 may be coupled to a lower surface of the traveling member 430. The common fastening device 440 may move in the first to third directions D1, D2, and D3 along the first to third guide rails by the traveling member 430.

Figure 5:
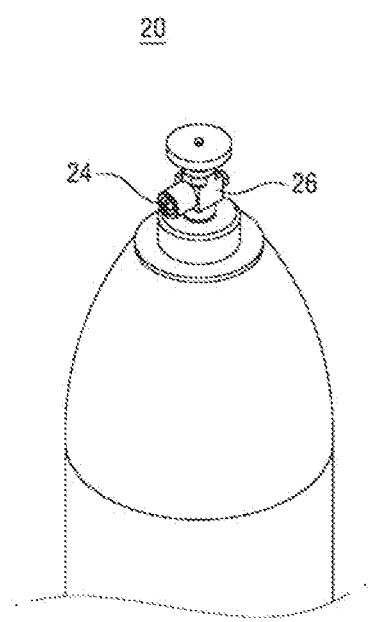
FIG. 5 is a view illustrating a gas cylinder of FIG. 4.

FIG. 5 is a view illustrating the gas cylinder of FIG. 4.

Referring to FIG. 5, the gas cylinder 20 may include a valve body 26 and a gas injection nozzle 24. The valve may be connected to the valve body 26. The gas injection nozzle 24 may protrude outwardly from the valve body 26. The gas stored in the gas cylinder 20 may be supplied to the outside through the gas injection nozzle 24. An end cap (not shown) may be coupled to the gas injection nozzle 24. For example, the end cap may be screwed onto the gas injection nozzle 24.

Referring to FIGS. 4 and 5 together, the plurality of fastening members 450 may be disposed on a sidewall of the gas cabinet 410. The fastening member 450 may be disposed on a side surface of the gas injection nozzle 24 of the gas cylinder 20 in the second direction D2. The fastening member 450 may include a CGA holder part and an end cap holder part protruding from an outer surface of the fastening member 450. The CGA holder part may be connected to a gas pipe connected to a semiconductor manufacturing process line. The end cap holder part may be coupled to an end cap coupled to the gas injection nozzle 24 of the gas cylinder 20.

An alignment mark may be formed on an upper surface of the fastening member 450. The alignment mark may be a mark indicating an alignment state of the fastening member 450. For example, the alignment mark may have a circular shape including a cross shape therein, but the present disclosure is not limited thereto.

The common fastening device 440 may include a vision sensor and a second actuator. The common fastening device 440 may be coupled to the traveling member 430 to move to a teaching point at which the fastening member 450 is located. Thereafter, the vision sensor may detect the alignment mark disposed on the upper surface of the fastening member 450. The controller 600 may determine alignment of the common fastening device 440 and the fastening member 450 in the first direction D1 and the second direction D2 based on the alignment mark detected by the vision sensor.

The gasket supplying device 470 may supply a gasket for preventing the gas provided from the gas injection nozzle 24 to the CGA holder unit 452 from leaking.

The controller 600 may control the traveling member 430 so that the common fastening device 440 is aligned with the fastening member 450. The common fastening device 440 may be moved in the first direction D1 and the second direction D2 by the traveling member 430 to be aligned with the fastening member 450. Thereafter, the aligned common fastening device 440 may move in the third direction D3 to be coupled to the fastening member 450. That is, the degree of misalignment between the common fastening device 440 and the fastening member 450 may be compensated by the traveling member 430 and the common fastening device 440.

In addition, the fastening member 450 coupled to the common fastening device 440 may be moved to the teaching point at which the gas injection nozzle 24 is located in order to be coupled with the gas cylinder 20. The vision sensor may detect a contour of the gas injection nozzle 24. The controller 600 may determine alignment of the fastening member 450 and the gas injection nozzle 24 in the first to third directions D1, D2, and D3 based on the contour of the gas injection nozzle 24 provided from the vision sensor.

The controller 600 may control the traveling member 430 so that the fastening member 450 is aligned with the gas injection nozzle 24. The fastening member 450 may move in the first to third directions D1, D2, and D3 by the traveling member 430 to be aligned with the fastening member 450. That is, the degree of misalignment between the gas injection nozzle 24 and the fastening member 450 may be compensated by the traveling member 430 and the common fastening device 440.

The second actuator may transmit power to the CGA holder part and the end cap holder part of the fastening member 450 coupled to the common fastening device 440. The second actuator may be, for example, a motor. The CGA holder part and the end cap holder part may be rotated in a clockwise or counterclockwise direction by the second actuator.

Accordingly, the CGA holder part may be coupled to or separated from the gas injection nozzle 24 by the second actuator. The end cap holder part may be coupled to the end cap coupled to the gas injection nozzle 24 by the second actuator to separate the end cap from the gas injection nozzle 24 or couple the end cap coupled to the end cap holder part again to the gas injection nozzle 24.

That is, when the gas cylinder 20 is seated in the gas cabinet 410, the common fastening device 440 may be aligned with the fastening member 450 disposed on the side surface of the seated gas cylinder 20 and then coupled. The end cap coupled to the gas injection nozzle 24 of the gas cylinder 20 may be coupled to the end cap holder part of the fastening member 450 by the common fastening device 440, and the gas injection nozzle 24 may be connected to the CGA holder part of the fastening member 450. When the gas stored in the gas cylinder 20 is exhausted, the gas injection nozzle 24 is separated from the CGA holder part of the fastening member 450 by the common fastening device 440 and is coupled to the end cap holder part so that the end cap may be coupled again.

Figure 6:
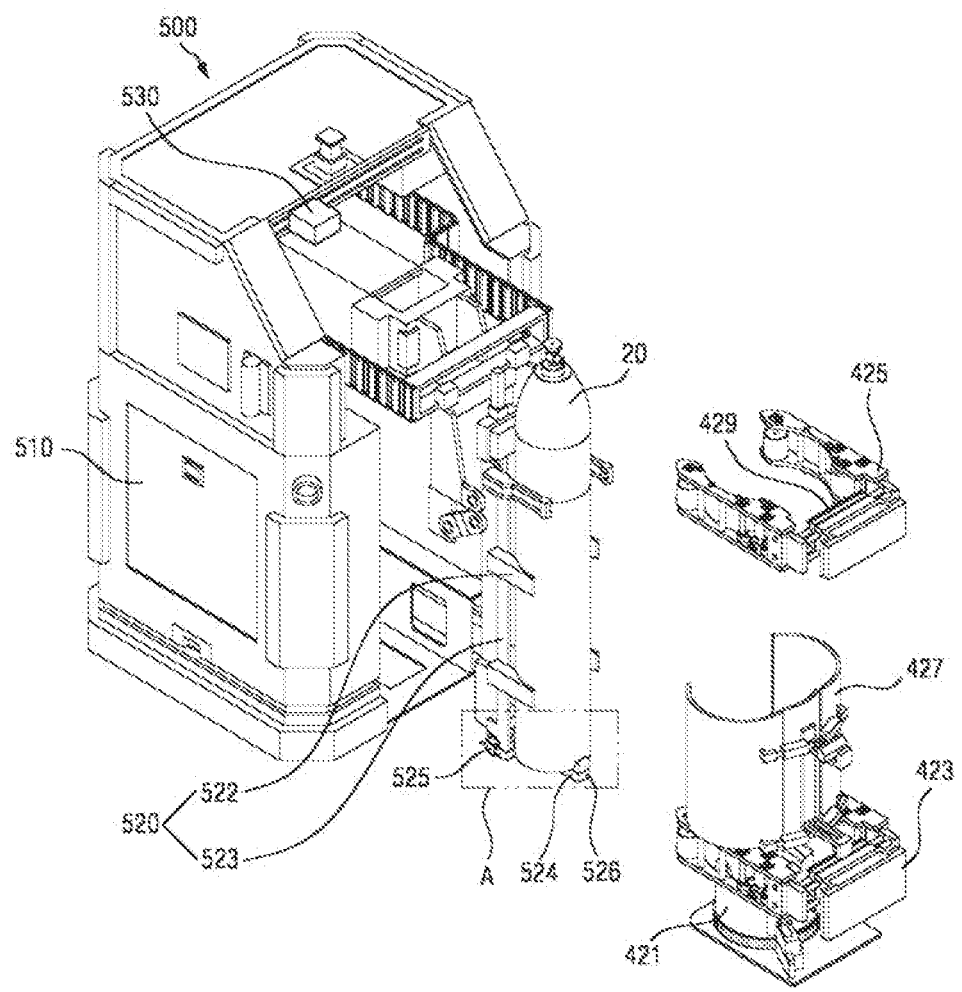
FIG. 6 is a view illustrating a mobile robot and a gas cabinet of FIGS. 1 and 2, in which only some components of the gas cabinet are illustrated.

FIG. 6 is a view illustrating the mobile robot and the gas cabinet of FIGS. 1 and 2, in which only some components of the gas cabinet are illustrated.

Referring to FIGS. 1, 2 and 6, the mobile robot 500 may include a body member 510, an arm member 520, and a second loading detecting sensor 530.

The arm member 520 may be disposed on one surface of the body member 510. The arm member 520 may include a third gripper 522, a driving part 523, and a third seating part 524. The driving part 523 may connect the body 510 and the third gripper 522 to each other. One end of the driving part 523 may be connected to the body member 510, and the other end may be connected to the third gripper 522.

The third gripper 522 may surround the side surface of the gas cylinder 20. The gas cylinder 20 may be fixed to the mobile robot 500 by the third gripper 522.

The driving part 523 may move in the first to third directions D1, D2, and D3. The gas cylinder 20 fixed to the third gripper 522 may be moved in the first to third directions D1, D2, and D3 by the driving part 523.

A first distance measuring sensor 525 may be disposed on each of both side surfaces of the driving part 523. A (1-1)-th distance measuring sensor may be disposed on one side surface of the driving part 523, and a (1-2)-th distance measuring sensor may be disposed on a surface facing the (1-1)-th distance measuring sensor.

The first distance measuring sensor 525 may detect a facing first surface of the second seating part 421 using a laser. The controller 600 may recognize a distance from the mobile robot 500 to the second seating part 421 based on the first surface of the second seating part 421 detected by the first distance measuring sensor 525. In addition, the controller 600 may detect a difference in inclination between the mobile robot 500 and the second seating part 421 based on the first surface of the second seating part 421 detected by the first distance measuring sensor 525. That is, the controller 600 may detect an angle at which the second seating part 421 is inclined with respect to the mobile robot 500. The first distance measuring sensor 525 may be, for example, an LDS sensor.

Accordingly, the mobile robot 500 may be aligned with the second seating part 421 under the control of the controller 600.

The third seating part 524 may be disposed on the lowermost surface of the driving part 523. The third seating part 524 may protrude from the center of the driving part 523 in the first direction D1. The gas cylinder 20 may be seated on the third seating part 524.

The third seating part 524 may further include a second distance measuring sensor 526. The second distance measuring sensor 526 may be disposed on the third seating part 524. The second distance measuring sensor 526 may detect the first surface of the second seating part 421 facing the second distance measuring sensor 526. The second distance measuring sensor 526 may detect a QR mark disposed on the first surface. The second distance measuring sensor 526 may be, for example, a QR code reader. The controller 600 may detect a position difference and/or an inclined angle between the mobile robot 500 and the second seating part 421 based on the QR mark detected by the second distance measuring sensor 526.

Accordingly, the mobile robot 500 may be aligned with the second seating part 421 under the control of the controller 600. The mobile robot 500 may be aligned with the gas cabinet 410 by a first distance measuring sensor 525 and/or the second distance measuring sensor 526.

Since the mobile robot 500 according to some example embodiments of the present disclosure includes the first and second distance measuring sensors 525 and 526 in the arm member 520, when the arm member 520 loads the gas cylinder 20 and a position of the arm member 520 is shifted due to the weight of the gas cylinder 20, positions of the first and second distance measuring sensors 526 may also be shifted. Accordingly, the controller 600 may more accurately correct and control the alignment of the mobile robot 500 and the second seating part 421.

The second loading detecting sensor 530 may be disposed on the body member 510. The second loading detecting sensor 530 may be disposed on one surface of the body member 510 on which the arm member 520 is disposed. The second loading detecting sensor 530 may detect whether the gas cylinder 20 is loaded on the second seating part 421 in the gas cabinet 410 facing the second loading detecting sensor 530.

The second seating part 421, the lower clamp module 423, and the upper clamp module 425 may be disposed in the gas cabinet 410. The first loading detecting sensor 429 may be disposed on the upper clamp module 425. The first loading detecting sensor 429 may detect whether the gas cylinder 20 is loaded on the second seating part 421. In this drawing, although the first loading detecting sensor 429 is illustrated as being disposed on the upper clamp module 425, the present disclosure is not limited thereto. The first loading detecting sensor 429 may be disposed on, for example, the second seating part 421 or the lower clamp module 423 to detect whether the gas cylinder 20 is loaded.

The first loading detecting sensor 429 may detect whether the gas cylinder 20 is loaded on the second seating part 421. The controller 600 may determine that the gas cylinder 20 is not loaded on the second seating part 421 based on a detection result of the first loading detecting sensor 429. When the gas cylinder 20 is not loaded on the second seating part 421, the controller 600 may determine whether the mobile robot 500 is loading the gas cylinder 20. This is because the gas cylinder 20 should be provided to the second seating part 421 on which the gas cylinder 20 is not loaded.

The mobile robot 500 on which the gas cylinder 20 is loaded may move to the gas cabinet 410 under the control of the controller 600. The mobile robot 500 may move to the second seating part 421 in which the gas cylinder 20 in the gas cabinet 410 is to be provided. The second loading detecting sensor 530 disposed in the mobile robot 500 may detect whether the gas cylinder 20 is loaded on the second seating part 421. The controller 600 may further determine that the gas cylinder 20 is not loaded on the second seating part 421 based on a detection result of the second loading detecting sensor 530.

The arm member 520 of the mobile robot 500 may be positioned in front of the second seating part 421 so as not to collide with other components in the gas cabinet 410. The second seating part 421 may include a recess indented into a center part. The third seating part 524 of the mobile robot 500 may be seated in the recess formed in the second seating part 421.

When the arm member 520 provides the gas cylinder 20 to the gas cabinet 410, the lower clamp module 423 and the upper clamp module 425 may semi-grip the gas cylinder 20. When the lower clamp module 423 and the upper clamp module 425 completely grip the gas cylinder 20, the arm member 520 of the mobile robot 500 may provide the gas cylinder 20 to the gas cabinet 410.

Referring back to FIG. 1, the gas cylinders are separated one by one in the gas cylinder transfer unit 100 and the gas cylinders are moved to the storage queue 310 and stored in the storage queue 310, and thereafter, when the gas cylinders are transferred to the gas cabinet 410 by the mobile robot 500, excessive vibration or impact may be applied to the gas cylinder. When excessive vibration or impact is applied to the gas cylinder, the gas inside the gas cylinder may be mixed.

In the gas cabinet 410, an automatic fastening device separates the end cap of the gas cylinder, a gas supply pipe is connected to the gas cylinder, and then gas may be supplied to the gas supply pipe. The automatic fastening device may refasten the end cap to the gas cylinder. If an axis is misaligned in the process of separating and fastening the end cap, an excessive force may be applied to the end cap.

Accordingly, it is desirable to check force, torque, vibration, and a change in inclination, in each of the modules such as the gas cylinder transfer unit 100, the storage queue 310, the mobile robot 500, and the gas cabinet 410 of the gas cylinder automation system.

According to some example embodiments of the present disclosure, a sensor capable of measuring force, torque, vibration, change in inclination, etc. applied to a gas cylinder is manufactured in a cylinder type, and the cylinder-type sensor may be provided to the gas cylinder automation system. A shape of the cylinder-type sensor may be the same or substantially the same as a shape of the gas cylinder. Therefore, there is an effect that the cylinder-type sensor may check whether each module of the gas cylinder automation system is abnormal, while moving within the gas cylinder automation system, even without shutting down the entire gas cylinder automation system.

Figure 7:
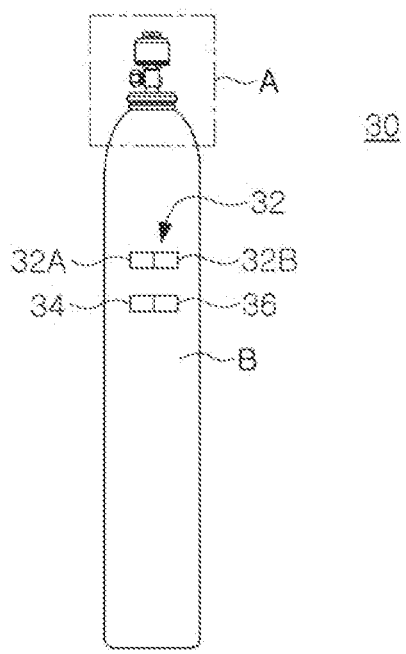
FIG. 7 is a perspective view of a cylinder sensor according to some example embodiments of the present disclosure.
Figure 8:
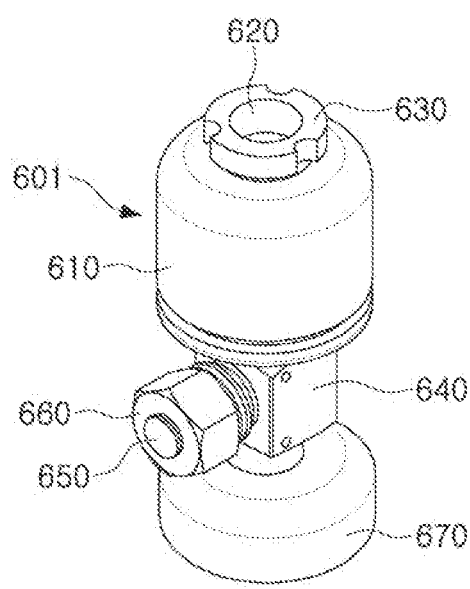
FIGS. 8 and 9 illustrate an air-operated valve according to the Comparative Example illustrating a cylinder head according to some example embodiments of the present disclosure.
Figure 9:
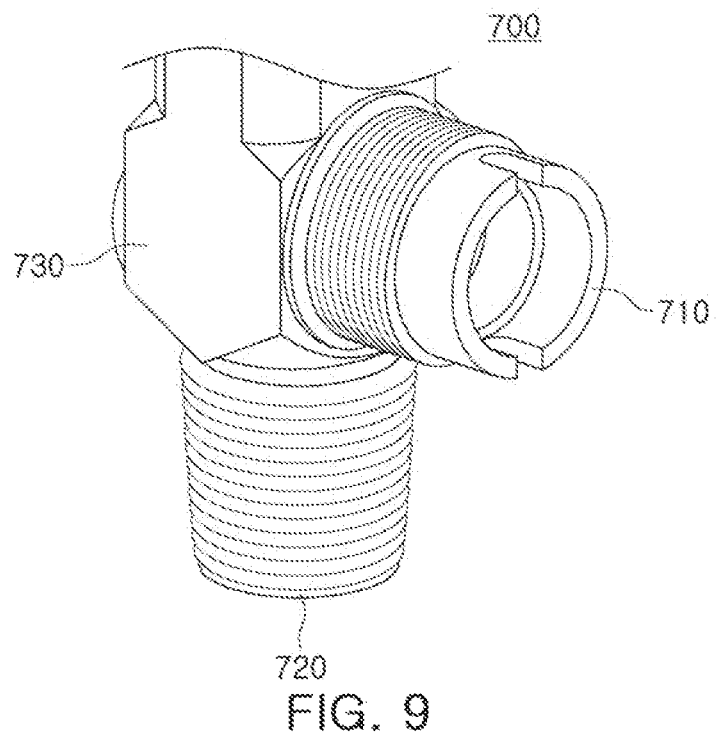
Figure 10:
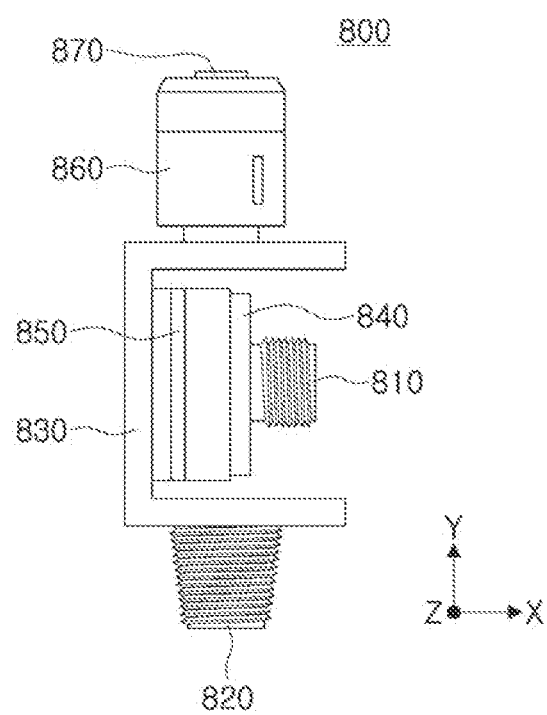
FIG. 10 is a view illustrating an air-operated valve according to some example embodiments of the present disclosure.

FIG. 7 is a perspective view of a cylinder sensor according to some example embodiments of the present disclosure, FIGS. 8 and 9 are air-operated valves according to a comparative example for explaining a cylinder head according to some example embodiments of the present disclosure, and FIG. 10 is a view illustrating a cylinder head according to some example embodiments of the present disclosure.

Referring to FIG. 7, a cylinder-type sensor 30 may include a cylinder head A and a cylinder body B. The cylinder head A may correspond to an air-operated valve having a structure that is opened and closed by elevating a diaphragm using pneumatic pressure.

The cylinder head A of the cylinder-type sensor 30 may include a first detecting sensor including a force/torque sensor. For example, the first detecting sensor may be a 6-axis force/torque sensor. The first detecting sensor may detect a force and/or torque applied to the end cap of the cylinder-type sensor 30 and output a detection result.

The cylinder body B of the cylinder-type sensor 30 may be connected to the cylinder head A. Meanwhile, the cylinder body B may include a second detecting sensor 32 including an acceleration sensor and/or an inclination sensor, a communication module 34, and a battery 36. For example, a second detecting sensor 32 may be mounted on one side of the cylinder body B.

The acceleration sensor 32A may detect vibration and/or impact of the cylinder-type sensor 30 and output a detection result. For example, the acceleration sensor 32A may detect vibrations applied to the cylinder-type sensor 30, while the cylinder-type sensor 30 according to some example embodiments of the present disclosure moves to each module inside the gas cylinder automation system.

The inclination sensor 32B may detect an inclination of the cylinder-type sensor 30 and output a detection result. For example, the inclination sensor 32B may detect whether a gripper for fixing the cylinder-type sensor 30 is normally operated, while the cylinder-type sensor 30 moves to each module inside the gas cylinder automation system.

The communication module 34 may wirelessly transmit a detection result of each of the force/torque sensor 850, the acceleration sensor 32A, and the inclination sensor 32B to an external device. The battery 36 may supply power to a force/torque sensor 850, an acceleration sensor 32A, an inclination sensor 32B, and a communication module 34.

Using the detection result of the force/torque sensor 850, it may be determined whether excessive force is applied to the end cap 660 in the process of separating and fastening the end cap of the cylinder-type sensor 30. Using the detection result of the acceleration sensor 32A, it may be determined whether excessive vibration or shock is applied to the cylinder-type sensor 30 while the cylinder-type sensor 30 is transferred. Using a detection result of the inclination sensor 32B, it may be determined whether the cylinder-type sensor 30 is inclined more than a reference value while the cylinder-type sensor 30 is being transported and stored.

Referring to FIGS. 8 and 9, the air-operated valve 601 includes a first valve body 610, a quick coupler 620, a lock device fastener 630, a second valve body 640, an end cap fastening member 650, an end cap 660, and a cylinder body fastening member 670.

The first valve body 610 may be installed at a gas outlet of the cylinder body B. The quick coupler 620 may be installed at an upper end of the first valve body 610. The quick coupler 620 may be connected to a pneumatic line through which pneumatic pressure is provided. The quick coupler 620 may accommodate an alignment mechanism of the pneumatic line and the first valve body 610.

In order to prevent or mitigate gas leakage due to damage to an elastic member that elastically supports the diaphragm due to vibration, the lock device fastener 630 in which a lock device unit, which is a kind of safety device, is installed is provided at an upper end of the first valve body 610. The lock device fastener 630 may have a shape surrounding the quick coupler 620.

The end cap fastening member 650 may protrude outwardly from the second valve body 640. The end cap 660 may be coupled to the end cap fastening member 650. For example, the end cap 660 may be screwed to the end cap fastening member 650.

The cylinder body fastening member 670 may be coupled to the cylinder body B. For example, the cylinder body B may be screwed to the cylinder body fastening member 670.

The air-operated valve 700 illustrated in FIG. 9 is formed by removing the end cap 660 from the air-operated valve 601 of FIG. 8. Referring to FIG. 9, the air-operated valve 700 may include an end cap fastening member 710, a cylinder body fastening member 720, and a valve body 730.

Referring to FIG. 10, a cylinder head 800 may include an end cap fastening member 810, a cylinder body fastening member 820, a housing 830, a mounting member 840, and a first detecting sensor 850.

The housing 830 may have a rectangular cross-section with one side open and three sides closed. However, this is only an example and the present disclosures may not be limited. For example, the housing 830 may be configured to include a space in which the first detecting sensor 850 may be mounted.

The end cap fastening member 810 may protrude outwardly from a first side of the mounting member 840. When the cylinder-type sensor including the cylinder head 800 is transferred in the gas cylinder automation system, the end cap fastening member 810 may be coupled with the end cap.

The first detecting sensor 850 may be mounted between a first side in the housing 830 and a second side of the mounting member 840. The first detecting sensor 850 may be a force/torque sensor, and the force/torque sensor may be a 6-axis force/torque sensor.

The first detecting sensor 850 may be disposed on one side of the end cap fastening member 810 and may detect a force and/or torque applied to the end cap. For example, the first detecting sensor 850 may detect a force and/or torque applied to the end cap when the automatic fastening device fastens the end cap to the end cap fastening member 810.

A detection result of the first detecting sensor 850 may be transmitted to the outside through a communication module included in the cylinder body.

The cylinder body fastening member 820 may protrude outwardly from the second side outside the housing 830. The cylinder body may be screwed to the cylinder body fastening member 820.

For example, the cylinder head 800 may further include a quick coupler 870 and a head body 860. The quick coupler 870 may be connected to a pneumatic line through which pneumatic pressure is provided. The head body 860 may be disposed between the quick coupler 870 and a third side outside the housing 830.

According to some example embodiments of the present disclosure, the cylinder-type sensor may have the same or substantially the same shape as that of the gas cylinder. Therefore, there is an effect that whether each module of the gas cylinder automation system is abnormal may be checked, while the cylinder-type sensor moves to each module in the gas cylinder automation system, even without shutting down the entire gas cylinder automation system.

As set forth above, according to example embodiments of the present disclosure, by providing a cylinder-type sensor capable of measuring force, torque, and acceleration applied to a gas cylinder to the gas cylinder automation system, whether the gas cylinder automation system is abnormal may be checked even without shutting down the entire gas cylinder automation system.

While some example embodiments have been shown and described above, it will be apparent to those skilled in the art that modifications and variations could be made without departing from the scope of the present disclosure as defined by the appended claims.

What is claimed is:

1. A gas cylinder automation system comprising:
a gas cylinder delivery system including a plurality of mobile robots configured to automatically supply gas cylinders along a transfer path from one of a gas cylinder storage queue or gas storage cabinet of the gas cylinder automation system to a semiconductor process line; and
a cylinder-type sensor configured to check whether the transfer path is abnormal by moving along the transfer path by one of the plurality of mobile robots,
wherein the cylinder-type sensor includes:
a cylinder head including an end cap fastening member and an end cap coupled to the end cap fastening member and the cylinder head having a first detecting sensor on the end cap fastening member, the first detecting sensor being configured to detect a torque applied to the end cap; and
a cylinder body connected to the cylinder head and having a second detecting sensor on the cylinder body, the second detecting sensor including one of an acceleration sensor or an inclination sensor.

2. The gas cylinder automation system of claim 1, wherein the one of the plurality of mobile robots carrying the cylinder-type sensor is controlled to move to each module inside the gas cylinder automation system.

3. The gas cylinder automation system of claim 2, wherein a force or torque applied to a gas cylinder moving to each module inside the gas cylinder automation system is measured based on a detection result of the first detecting sensor.

4. The gas cylinder automation system of claim 2, wherein whether each module inside the transfer path is abnormal is detected based on detection results of the first detecting sensor.

5. The gas cylinder automation system of claim 1, wherein the second detecting sensor includes an acceleration sensor configured to detect vibrations applied to the cylinder-type sensor.

6. The gas cylinder automation system of claim 1, wherein the second detecting sensor includes an inclination sensor configured to sense an inclination of the cylinder-type sensor.

7. The gas cylinder automation system of claim 1, wherein the cylinder head includes a housing and a mounting member on the housing, and the first detecting sensor is between the housing and the mounting member.

8. The gas cylinder automation system of claim 1, wherein the cylinder body includes a wireless communication module configured to wirelessly transmit a detection result of the first detecting sensor and the second detecting sensor.

9. The gas cylinder automation system of claim 8, wherein the cylinder-type sensor further includes a battery connected to the wireless communication module.

10. The gas cylinder automation system of claim 1, wherein the cylinder-type sensor further includes a battery connected to the second detecting sensor.

* * * * *